March 31, 1970     S. SCHENKERMAN     3,503,680

RANGE MEASURING SYSTEM

Filed March 31, 1967     2 Sheets-Sheet 1

INVENTOR.
Stanley Schenkerman
BY
Irving M. Kriegsman
ATTORNEY.

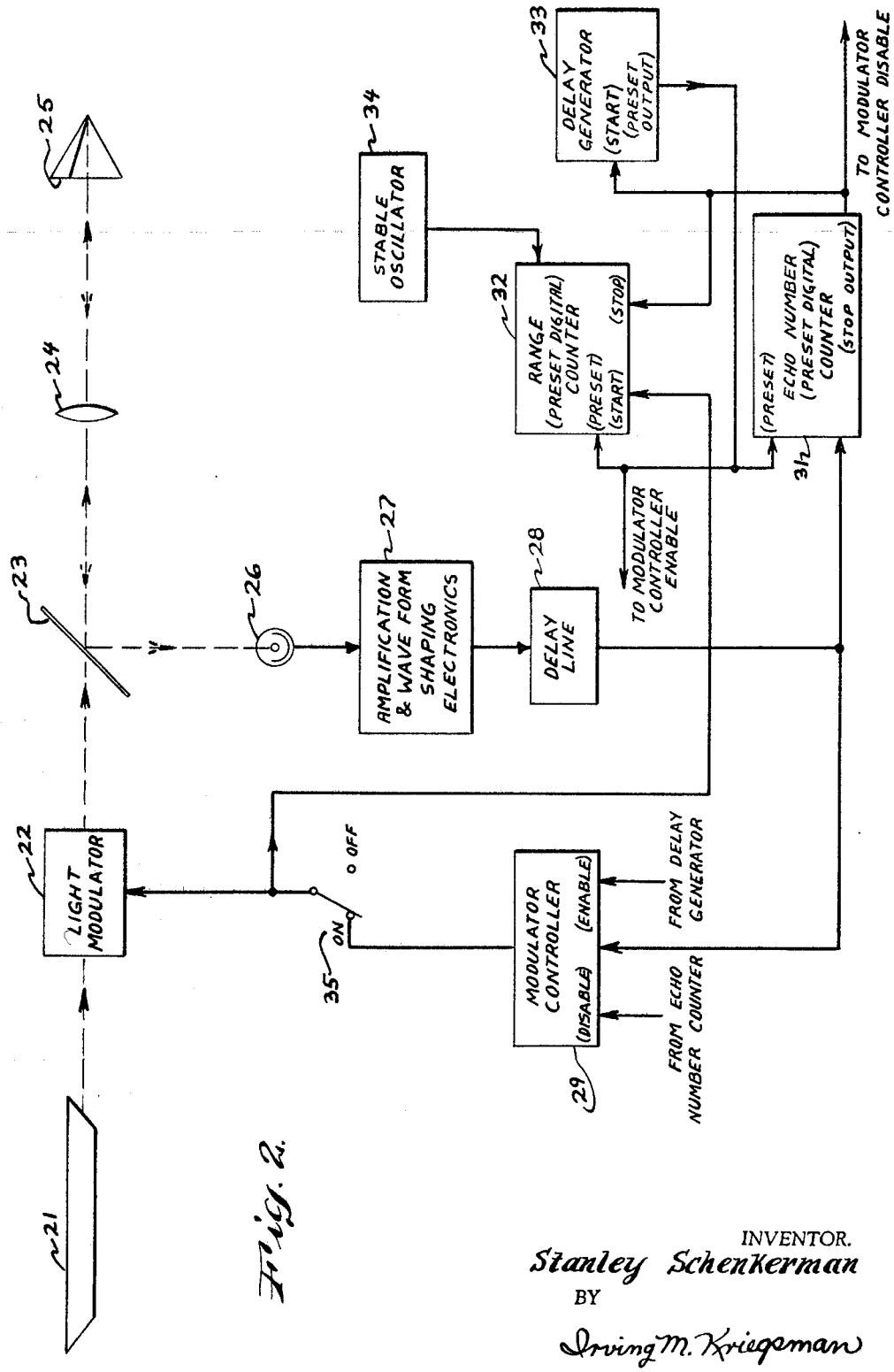

United States Patent Office 3,503,680
Patented Mar. 31, 1970

3,503,680
RANGE MEASURING SYSTEM
Stanley Schenkerman, Mamaroneck, N.Y., assignor to The Perkin-Elmer Corporation, Norwalk, Conn., a corporation of New York
Filed Mar. 31, 1967, Ser. No. 627,507
Int. Cl. G01c 3/00; G01s 7/48
U.S. Cl. 356—5                                10 Claims

ABSTRACT OF THE DISCLOSURE

A pulse of energy is sent out in the direction of a target whose distance is being measured. The pulse is reflected by the target. When the echo pulse returns it is used as a signal for sending out another pulse of energy. Distance is measured by counting the time interval between the transmission of the first and the arrival back of the echo of the last of a predetermined number of pulses. The distance is proportional to and can be determined from this time interval.

---

Figure 1:
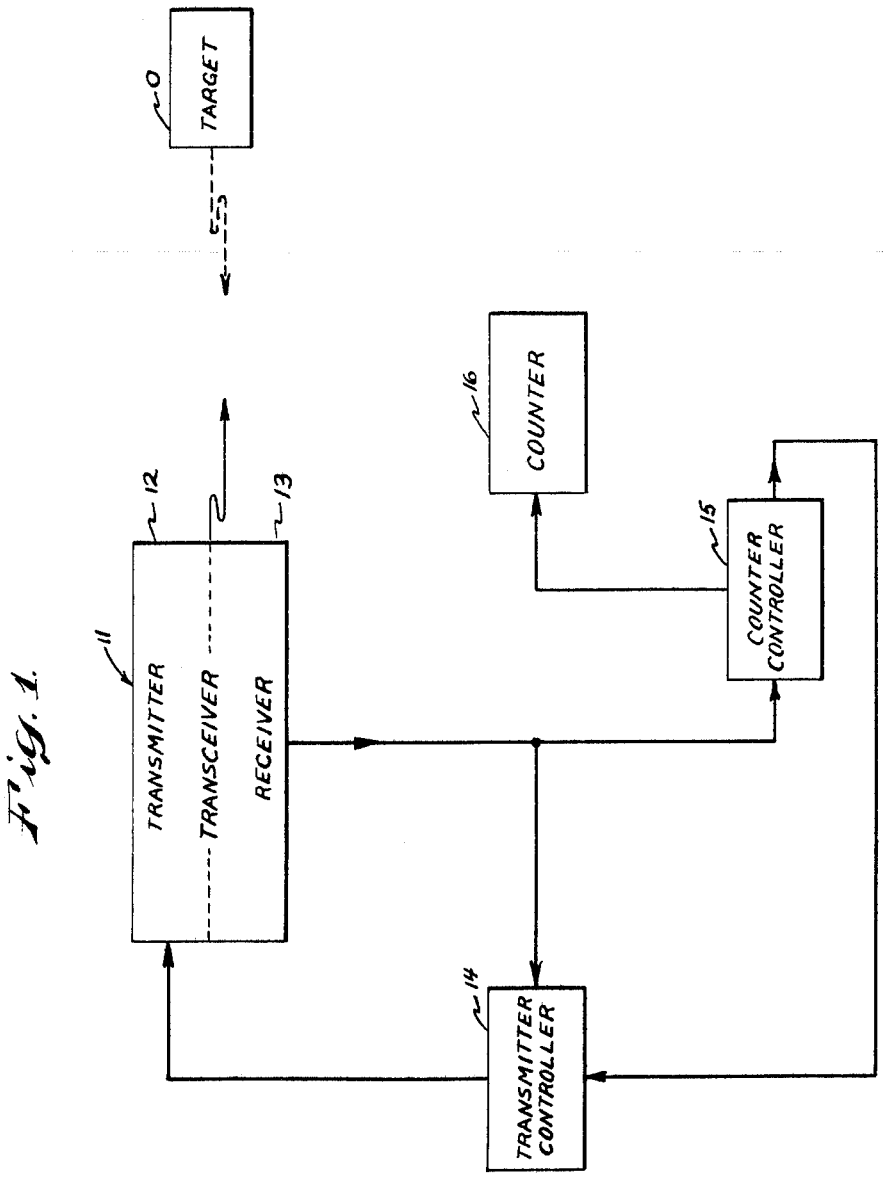

This invention relates to range measuring systems. More particularly this invention relates to a system which utilizes the emission and propagation of energy in the form of waves for measuring the distance to a target.

Basically, the invention comes within the family of so-called radar type distance measuring systems. The two most well known types of radar systems are the pulse radar and the continuous wave radar.

In a pulse type radar a series of accurately timed and very short pulses of radio frequency energy are sent out by a transceiver to a target. On striking the target some of the energy is reflected. These reflections or echoes are subsequently picked up by the transceiver. The time required for any one pulse to travel to the target and back to the transceiver is a measure of the distance from the transceiver to the target. The usual way of measuring this time interval is to turn on a gate at the time a pulse is sent out and then with a very stable clock or oscillator count the number of pulses transmitted until the echo pulse is received. This accumulated count is directly proportioned to the distance. Although pulse radar is suitable for both fixed and moving targets it is primarily used against fixed targets or targets that are moving relatively slowly.

A continuous wave radar is a system which differentiates between fixed and moving targets by detecting the change in frequency of the reflected wave caused by the Doppler effects. This change in frequency is proportional to the target velocity toward or away from the transceiver. By comparing the shifted frequency with the originally transmitted frequency, the velocity toward or away from the target can be measured. Although the basic continuous wave type radar cannot measure the distance to a fixed target, by making a phase comparison rather than a frequency comparison it is possible to use this type of radar to measure the distance to a fixed target.

One disadvantage of pulse type radar is that in order to get accurate or precise results it is necessary to use a very high frequency clock. Another disadvantage of the pulse radar is that somewhat elaborate electronics must be employed for measuring relatively small distances insofar as the time of return of the echo pulse varies in proportion to the distance. Another disadvantage of the pulse type radar system is that the maximum range is dependent on the pulse repetition rate.

The continuous wave type radar also has its disadvantages. Basically the continuous wave radar is a fairly complex apparatus which requires frequent adjustments insofar as any parasitic or extraneous phase shifts will throw the measurement off.

Another disadvantage is what is known as ambiguity. Basically, ambiguity is the difficulty in measuring target ranges that are multiples of a full wavelength of the CW frequency insofar as the system is unable to tell which one of the full cycles or which number of integral cycles the system is on. Another disadvantage is that in order to get tangible measurable results the actual transmitted wave must be of a very high frequency.

Accordingly it is an object of this invention to provide a new system for measuring distance.

It is another object of this invention to provide a new system for measuring distance to a target which may be either fixed or moving and either co-operative or non-co-operative.

It is still another object of this invention to provide a system for measuring range which employs the time of propagation of energy.

It is yet still another object of this invention to provide a system for measuring range which utilizes the time of propagation of energy that does not require high frequency counting and in which the maximum distance that can be measured is not limited by the repetition rate of the system.

It is another object of this invention to provide a range measuring system that does require the high frequency requirements of conventional pulse and continuous wave type radar systems.

It is still another object of this invention to provide a system for measuring absolute range to a target employing the time of propagation of energy and which involves counting the time required to accumulate a predetermined number of echo pulses as a measurement of the range.

The above and other objects are achieved by constructing a range measuring system in accordance with this invention.

Basically the concept of the invention involves sending out a pulse of energy and then using the echo or return pulse to send out another pulse of energy. This process is repeated until a predetermined number of echo pulses have been received. The time required to receive this predetermined number of echo pulses is proportional to the target range.

The energy employed can be any type of radiation that can be propagated through space or through a material medium in the form of waves such as, for example, an electromagnetic radiation or acoustical radiation.

The theory involved can be explained in the following manner. The time required for a pulse of energy to travel from a transceiver to a target and then back to a transceiver can be represented by the formula $$t = 2r/c$$

where $t$ is the time, $r$ is the range or distance to the target, $c$ is the velocity of the energy propagated and where $r$ and $c$ are in compatible units. In prior art radar systems this time interval $2r/c$ is measured and used to determine the range of the target. However, in this invention, instead of measuring a single time interval $2r/c$, a plurality $m$ of time intervals $2r/c$ are measured where $m$ is a predetermined number. This time interval $2mr/c$ is also proportional to the range but will have much higher resolution and be a more precise measurement of range insofar as the time interval over which the measurement interval occurs will be $m$ times as long.

The invention will become more fully understood and other features and advantages will become apparent on reading the following detailed description when taken in conjunction with the drawings in which like reference numerals represent like parts and wherein FIG. 1 is a block diagram of a generalized embodiment of the invention and FIG. 2 is a schematic diagram of a specific embodiment of the invention.

Referring now to FIG. 1 there is shown in block diagram form a generalized embodiment of a range measuring system of this invention. The system includes a transceiver represented by reference numeral 11. The transceiver 11 comprises a transmitter 12 for sending out pulses of wave energy and a receiver 13 for receiving echoes of these pulses which are reflected from an object O whose distance is being measured. The output from the receiver 11 is applied jointly to a transmitter controller 14 and a counter controller 15. The output from the counter controller 15 is applied jointly to a counter 16 and to the transmitter controller 14. The output from the transmitter controller 14 is applied to the transmitter 12.

The transmitter controller 14 is essentially an electronically operated switch such as for example an AND gate which causes the transmitter 12 to send out a pulse of energy in accordance with the time of arrival of reflected energy from the target or object O.

Counter 16 is essentially a time interval counter which measures the time interval from the transmission of the first pulse to the return at the receiver 13 from the $m$th echo pulse.

The purpose of the counter controller 15 is to control the counter 16 in accordance with a preselected number "$m$" and also to enable the transmitter controller 14.

A typical counter that may be used for the counter controller 15 is the Hewlett Packard Company type 5214L Preset Counter which is described in the Electronics Buyers Guide, 1964 Edition, McGraw Hill, pages 474–475. This counter may also be used for counter 16.

The system operates as follows. A predetermined number $m$ is set in the counter controller 15. A pulse of energy sent out by the transmitter 12 is reflected by the target O and received back at the receiver 13 after a time interval equal to $2r/c$. The output from the receiver 13 is applied to the transmitter controller 14 which in turn causes the transmitter 12 to send out another pulse of energy. When this pulse is received back it in turn will be fed from the receiver 13 to the transmitter controller 14 causing the transmitter 12 to send out another pulse. Thus each time a pulse of energy returns to the receiver 13 another pulse of energy is sent out. At the same time all echo pulses are counted by the counter controller 15 until the $m$th echo is counted. During this time counter 16 is measuring elapsed time. When the $m$th echo is counted by the counter controller 15, the number in the counter 16 is proportional to $2mr/c$ which represents the elapsed time to accumulate $m$ echoes. This number $2mr/c$ is directly and precisely proportional to the target range.

Referring now to FIGURE 2 there is shown a specific embodiment of the invention in which the propagatable energy is light.

The system includes a light source 21 in the form of a helium-neon laser, an electrically activated light modulator or shutter 22 in the form of a Kerr cell, a beam splitter 23, a lens system 24 which is shown as a single lens, a target 25 in the form of a retroreflector, and a light detector 26 in the form of a phototube. The lens system 24 serves two purposes, namely, to collimate the beam of light transmitted through the beamsplitter 23 and also to bring the reflected beam of light from the target 25 to focus at the light detector 26.

Assuming the light modulator 22 is in the "on" state, a beam of light from the source 21, passes through the light modulator 22 and beam splitter 23, is collimated by the lens system 24 and impinges on the target 25. The reflected beam of light from the target 25 is transmitted back through the lens system 24 to the beam splitter 23 which redirects the light to the detector 26. The reflected light is brought to focus by means of the lens system 24 at the light detector 26.

The light detector 26 is coupled to an electrical amplifying and wave form shaping system 27 of the type well known in the art. The purposes of the amplifying and wave form shaping system is to amplify the output from the detector 26 and also to sharpen the leading and trailing edges and flatten out the top of the pulse. System 27 may be, for example, an amplifier and a one shot multivibrator.

The amplifying and wave form shaping system 27 is connected to a delay line 28. The purpose of the delay line is to put into the system a fixed delay time $td$, so that very small range measurements can be made. Examples of delay lines that may be used are a mercury delay line, an electrical delay line, a digital delay line or a shift register.

The delay line 28 is coupled to a modulator controller 29 and is also coupled to an echo number preset digital counter 31. The echo number preset digital counter 31 is coupled to the modulator 29, a range preset digital counter 32 and a delay generator 33. The range preset digital counter 32 is coupled to an oscillator 34. The delay generator 33 is also coupled to the range preset digital counter 32 and the modulator controller 29. The modulator controller 29 is coupled to a switch 35 which in turn is coupled to the light modulator 22.

Delay generator 33 may be, for example, a one shot multivibrator.

Modulator controller 29 may be, for example, an AND gate. The purpose of the modulator controller 29 is to activate the light modulator 22.

The range preset digital counter 32 is essentially a bidirectional counter which can be preset to a predetermined negative number and will start and stop on command. An example of a counter that may be used for the range preset digital counter 32 is the Data Tech Corp. Bi Directional Counter described in the Electronics Buyers Guide, 1964, McGraw Hill, page 447. The purpose of the oscillator 34 is to provide a continuous stream of pulses which are applied to and counted up by the range preset digital counter 32.

The echo counter 31 is the same type of counter as counter controller 15 in the FIGURE 1 embodiment. The purpose of the echo counter 31 is to count the number of echoes received, to start and stop the range counter 32, to enable and disable the modulator controller 29 and to control the delay generator 33.

The purpose of the delay generator 33 is to allow a time delay after a complete measuring cycle has been made so that the system can automatically reset itself and make another range measurement.

The system operates in the following manner.

The echo number counter 31 is preset to a predetermined number $m$. Any number may be chosen for $m$. The larger the $m$ the higher the resolution of the system, however, the larger the $m$ the lower the sampling rate at which measurements can be made. For example, $m$ can be set at 10,000 in which case it will take 10,000 echos to complete one range measurement. The range counter 32 is preset to a number equal to $(-m \cdot t_d \cdot f_o)$ where $m$ is the number of preselected echos, $t_d$ is the delay time of delay line 28, and $f_o$ is the frequency of the oscillator 34.

With manual switch 35 in the on position and assuming light modulator 22 is momentarily in the on state, light passes through the light modulator 22, the beam splitter 23, the lens system 24 and impinges on the target 25. Simultaneously the range counter 32 is activated.

Light reflected by the target 25 returns through the lens system 24 is reflected by the beam splitter 23 and is brought to focus at the light detector 26. The light detector 26 converts this light pulse to an electrical pulse which is amplified and shaped by the amplification and wave form shaping electronics 27. The amplified and shaped pulse is then delayed by an amount $t_d$ in the delay line 28. The output signal from the delay line 28 is applied to the modulator controller 29 which activates the light modulator 22 allowing another short impulse of light to pass through.

At the same time the output pulse from the delay line 28 is applied to echo number counter 31, increasing the count by one. Thus the system continuously recycles. Simultaneously, the range counter 32 accumulates clock frequency pulses from the oscillator so that its contents are increasing at $f_o$ pulses per sec.

This complete process continues until the echo number counter item 31 counts to $m$ echo pulses, or, in other words, until the output from delay line 28 has energized the echo number counter item 31 $m$ times. When the echo number counter 31 accumulates $m$ echos, it generates a stop pulse which stops the range counter 32 and starts the delay generator 33. This stop pulse also disables the modulator controller 29 thereby inhibiting further transmission of light pulses to the target. The contents of the range counter 31 is a number equal to $$\left[ 2m \cdot f_o \cdot \frac{r}{c} \right]$$

where all the variables have been defined before. Therefore, the number in the range counter is directly proportional to the target range and is in fact a very high resolution measure of the target range. After a time delay $tc$ the delay generator 33 sends out a reset pulse which presets the echo number counter 31; presets the range counter 32; and enables the modulator controller 29 so that another pulse of light will be sent out.

An embodiment of the invention that was actually built and successfully tested is described in an article entitled Digital Laser Ranging and Tracking Using a Compound Axis Servomechanism appearing in Applied Optics, April 1966, vol. 5, No. 4, pages 497 through 505.

Obviously numerous modifications and variations of the present invention are possible in the light of the above teachings. It is therefore to be understood that within the scope of the appended claims the invention may be practical otherwise than as specifically described therein.

I claim:
1. A system for measuring the distance to a target comprising:
   a transmitter for sending out in the direction of said target a pulse of propagatable energy in response to a signal,
   a receiver positioned to receive the echo of the pulse energy sent out by said transmitter reflected by said target and produce an output signal in response thereto,
   means for measuring the time interval between the transmission of the first and receival of the output signal from the receiver of the echo of the last of a predetermined number of pulses and providing an output signal during said time interval,
   and a transmitter controller coupled to said transmitter, said counting means and the output from said receiver for supplying a signal to said transmitter when energized by both by said output from said receiver and said counting means,
   whereby said time interval is proportional to said target distance.
2. A system for measuring distance to a target comprising:
   means for generating a beam of light,
   means disposed along the path of said beam of light for passing a pulse of said light in response to a signal,
   a reflector for reflecting said pulse of light,
   a light detector positioned to receive the reflected pulse of light and produce an output signal in response thereto,
   timing means operably coupled to said light detector for measuring the time interval between the transmission of the first of a predetermined number of consecutive pulses and the receipt by said timing means of a signal from said light detector of the last of said predetermined number of pulses,
   and control means coupled to said means for passing a pulse of light, said output from said light detector and said timing means for energizing said means for passing a pulse of light during those portions of said above mentioned time interval at which a signal is produced by said light detector.
3. The invention according to claim 2 and wherein said means for generating a beam of light comprises a laser.
4. The invention according to claim 2 and wherein said means for passing a pulse of said light comprises a light modulator.
5. The invention according to claim 2 and further including a beam splitter positioned between said light passing means and said reflector for reflecting the beam of light from the reflector in the direction of said light detector.
6. The invention according to claim 5 and further including lens means positioned between said beam splitter and said reflector for collimating the beam of light from said beam splitter and bringing the reflected light from the reflector to focus at said light detector.
7. The inevntion according to claim 2 and wherein said control means comprises an AND gate.
8. The invention according to claim 2 and wherein said timing means includes an echo counter, a range counter and an oscillator.
9. The invention according to claim 2 and further including means coupled between said light detector and said timing means for amplifying and shaping the output signal from said light detector.
10. The invention according to claim 2 and further including means coupled between said timing means and said light detector means for providing a fixed time delay of the output signal from the light detector.

References Cited

UNITED STATES PATENTS 3,164,725   1/1965   Straub _____ 356—5

RODNEY D. BENNETT, Jr., Primary Examiner

JEFFREY P. MORRIS, Assistant Examiner

U.S. Cl. X.R.

343—7.5